United States Patent [19]
Panin

[11] Patent Number: 5,181,430
[45] Date of Patent: Jan. 26, 1993

[54] FINE ADJUSTMENT CONTROL MECHANISM FOR ORIENTATION AND/OR POSITIONING OF A PAY LOAD

[75] Inventor: Fabio Panin, Valkenburg, Netherlands

[73] Assignee: Agence Spatiale Europeenne, Paris Cedex, France

[21] Appl. No.: 778,884

[22] PCT Filed: Jul. 3, 1990

[86] PCT No.: PCT/FR90/00498
§ 371 Date: Dec. 30, 1991
§ 102(e) Date: Dec. 30, 1991

[87] PCT Pub. No.: WO91/00976
PCT Pub. Date: Jan. 24, 1991

[30] Foreign Application Priority Data

Jul. 6, 1989 [FR] France .................. 89 09098

[51] Int. Cl.⁵ .......................... F16H 21/44
[52] U.S. Cl. .................. 74/99 R; 74/110; 248/662
[58] Field of Search .......... 74/99 R, 110; 248/651, 248/662

[56] References Cited

U.S. PATENT DOCUMENTS 3,617,670 11/1971 Linderfelt .................. 74/99 X
4,667,415 5/1987 Barsky ...................... 33/568

FOREIGN PATENT DOCUMENTS 0269925 6/1988 European Pat. Off. .
2517019 5/1983 France .
1514687 6/1978 United Kingdom .

OTHER PUBLICATIONS

L. Paratte: "Antennae pointing mechanisms handbook", section APM No. 7, May 1988, ESTEC, (Noordwijk, NL) pp. 1-2.
Journal of Guidance, Control and Dynamics, vol. 8, No. 1, Jan.-Feb. 1985, (New York, US) J. Broquet et al: "Antenna Pointing Systems for Large Communications Satellites", pp. 71-77.

Primary Examiner—Allan D. Herrmann
Attorney, Agent, or Firm—Oblon, Spivak, McClelland, Maier & Neustadt

[57] ABSTRACT

A mechanism for finely adjusting the orientation and/or the position of a payload, characterized in that it comprises: a resilient mechanism constituted by at least one continuous ring (10); a payload support device (15) suitable for transforming deformation of the ring into rotation or into combined rotation and translation; a ring deformation mechanism (11) suitable for directly applying simultaneous deformation forces at two diametrically opposite points of the ring; and a device (14) for varying the orientation of the diametral line of action of the ring deformation mechanism, thereby enabling the orientation and/or the position of the payload to be adjusted finely or coarsely. The mechanism is applicable to the optical industry, to pointing antennas, etc.

5 Claims, 3 Drawing Sheets

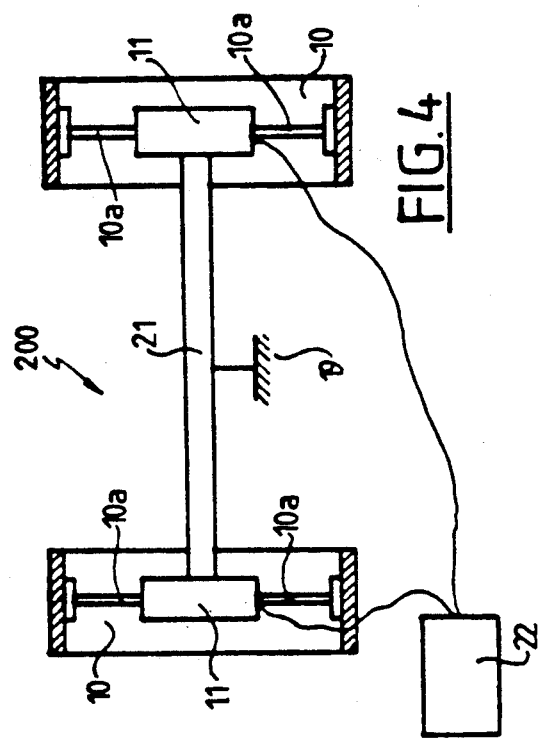
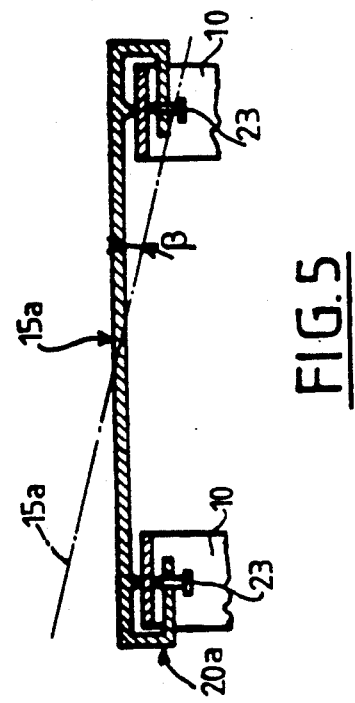
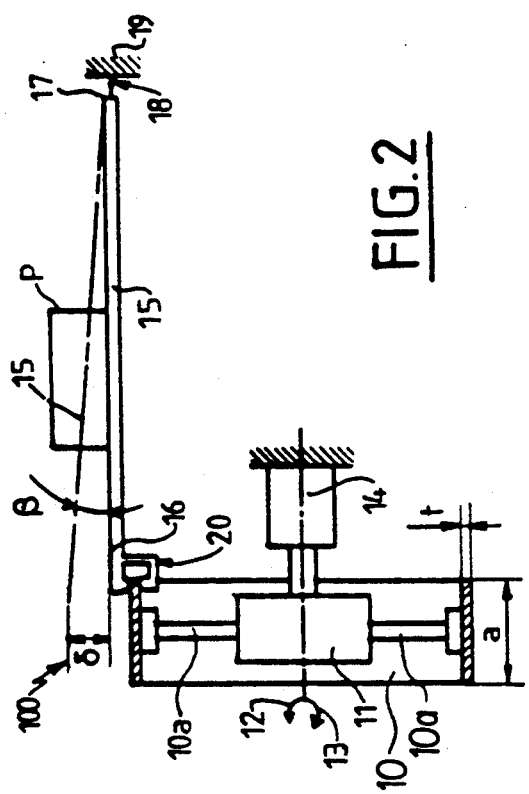
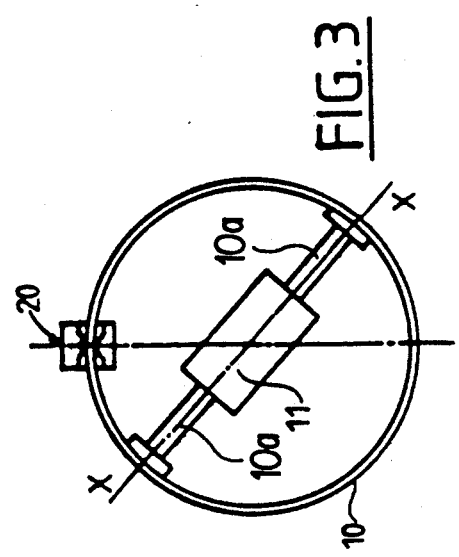

FINE ADJUSTMENT CONTROL MECHANISM FOR ORIENTATION AND/OR POSITIONING OF A PAY LOAD

BACKGROUND OF THE INVENTION

1. Field of the Invention

The present invention relates to a mechanism for fine adjustment of the orientation and/or the position of a payload, the mechanism being suitable for subjecting the payload to very small rotations and/or displacements.

2. Description of the Related Art

In the state of the art, small value rotations and/or displacements of a payload are obtained:

either by using systems with bar linkages suitable for reducing displacements (four bar linkages are conventional, or even six bar linkages for more complex systems);

or by using contacting pieces that move relative to one another over skewed surfaces that slope relative to the reference axes of the adjustment mechanism;

or else by using plane membranes including cutout zones that modify their deformation properties.

The work "Antenna pointing mechanisms handbook" (by L. Paratte, May 1988, Estec W.P. 1517) describes what may be considered as the best fine pointing mechanism that is available in the state of the art, enabling very small rotations of the payload to be obtained with an accuracy of two thousandths of a degree over a range of ±1.5 degrees, with these mechanisms being known under the reference Matra APM-PA.

However, mechanisms for obtaining fine adjustment of the orientation of a payload do not enable coarse adjustments to be obtained and they are essentially designed to operate within fixed and predetermined positioning ranges.

An accurate mechanism for displacing a payload, as developed by Dornier in West Germany, is also known. That mechanism is illustrated in FIG. 1 accompanying the description of the present invention. It may be observed that it includes a circularly symmetrical resilient component 1 constituted by a discontinuous (or open) resilient ring whose opposite bottom ends 2 and 3 are connected firstly to two actuator levers 4 and 5 which are inclined relative to the vertical, and whose lines of action pass through the center of the resilient ring, and secondly by a leaf spring 6 fixed to a shaft disposed in the center of the ring 1 and interconnecting the two ends 2 and 3 in such a manner as to direct the deformation of the ring 1 when the levers 4 and 5 are actuated to move towards each other, and in particular to direct the deformation downwards: in the Dornier device this is obtained by acting on an axial piece 7 (in the direction shown by the arrow), which piece is connected to the levers 4 and 5 via two auxiliary levers 4a and 5a. The resilient ring 1 can thus be deformed in such a manner that its diameter is reduced in the vertical direction by an amount s, as shown in FIG. 1, where the top of the ring 1 is shown as moving downwards when the two levers are actuated, thus obtaining downward deformation given the stress imposed by the leaf spring 6 which serves specifically to direct the deformation in the said direction.

However, it should be observed that in the Dornier mechanism:

it is possible to obtain translation movements only, rotation is not possible;

the open circular ring is deformed by means of actuator levers because of the two opposite ends of the ring moving towards each other under the control of the leaf spring; and the deformation force is not applied directly to the resilient ring but is applied via a lever system whose purpose is to provide a first displacement reduction.

SUMMARY OF THE INVENTION

An object of the present invention is thus to provide a mechanism for fine adjustment of the orientation and/or of the position of a payload and which satisfies practical requirements better than previously known mechanisms of the same type for the same purposes, in particular in that:

it enables linear displacement to be transformed into rotation or combined rotation and translation displacement;

the rotation of the payload may be made as small as necessary for practical requirements in the sense that there is no lower limit, at least in theory, on the rotation of the payload, and the limits that arise in practice are related solely to technological constraints;

it also serves to obtain coarse adjustment of payload rotation, and this is in addition to the possibility of obtaining exceptionally fine adjustments that is specific to the mechanism of the invention;

it does not suffer from backlash or from friction, thereby making it very highly reliable in operation and reducing sensitivity to environmental conditions, compared with prior devices;

its mechanical design is extremely simple;

its mass is relatively small;

it is very easy to connect the payload whose orientation is to be set by fine adjustment of its rotation;

it is very versatile in use;

it has no singular point within an adjustment range, unlike most presently existing mechanisms for adjusting orientation and/or position which have positions that are difficult or impossible to reach or for which kinematics are critical; and it allows great freedom in the design process because of the existence of several parameters that directly affect the construction of the mechanism.

The present invention provides a mechanism for finely adjusting the orientation and/or the position of a payload, the mechanism comprising:

payload support means;

elastically deformable resilient means that are circularly symmetrical in the non-deformed state;

deformation means for deforming the resilient means; and connection means for connecting the payload support means to the resilient means enabling deformations thereof to be communicated to the support means and thus to the payload;

which mechanism is characterized in that:

the resilient means are constituted by at least one continuous ring having predetermined radius, radial thickness, and axial width;

the payload support means is disposed relative to the ring in such a manner as to transform deformations thereof into rotation or into combined rotation and translation of the support means;

the deformation means for deforming the ring which cause the ring to go from the non-deformed state to the deformed state are suitable for applying an outwardly directed deformation force to said ring simultaneously at two diametrically opposite points of the ring defining a diametral action line of the deformation means, said ring having singular points which remain substantially stationary when the ring goes from the non-deformed state to the deformed state with the distribution of the singular points on the ring being a function of the orientation of the diametral line of action of the deformation means relative to a reference diameter of the ring passing through the location of said connection means thereon; and it further includes means for varying the orientation of the diametral action line of the ring deformation means within predetermined limits, thereby varying the distribution of said substantially fixed points of the ring in such a manner that the location of the connection means coincides with varying positions including positions close to and positions distant from said substantially fixed points of the ring, the deformations of the ring corresponding to said positions enabling fine and coarse adjustments respectively of the payload support means and thus of the payload.

In accordance with the invention, the deformation means are constituted by a double-acting actuator disposed inside the resilient ring so as to bear against two diametrically opposite points of the inside surface of the ring.

In a preferred embodiment of the adjustment mechanism of the invention, the resiliently deformable means are constituted by two rings each of which has an actuator of the above type disposed therein, these two actuators being connected to a fixed structure via a rigid link which interconnects the two actuators, the payload support means being constituted by a plate fixed at two opposite ends to the two rings.

In an advantageous embodiment of the adjustment mechanism of the invention, the resiliently deformable means are constituted by a single ring having the above-mentioned actuator disposed therein, the support means being constituted by a plate having one end fixed to the ring, and having its opposite end pivotally mounted to a fixed structure about a flexible pivot.

As appears from the following description, the invention includes further dispositions in addition to those specified above.

BRIEF DESCRIPTION OF THE DRAWINGS

The invention will be better understood from the following additional description which refers to the accompanying drawings, in which:

FIG. 2 is a diagram showing a first embodiment of the adjustment mechanism of the invention;

FIG. 3 shows the relative disposition between the connection means of the support means for the payload and the point of application of the deformation forces for the purpose of making coarse adjustment possible;

FIG. 4 is a diagram showing a second embodiment of the adjustment mechanism of the invention;

FIG. 5 is a diagram showing a detail of the fixing of the payload support plate which is omitted from FIG. 4 in order to simplify the drawing;

DESCRIPTION OF THE PREFERRED EMBODIMENTS

Figure 1:
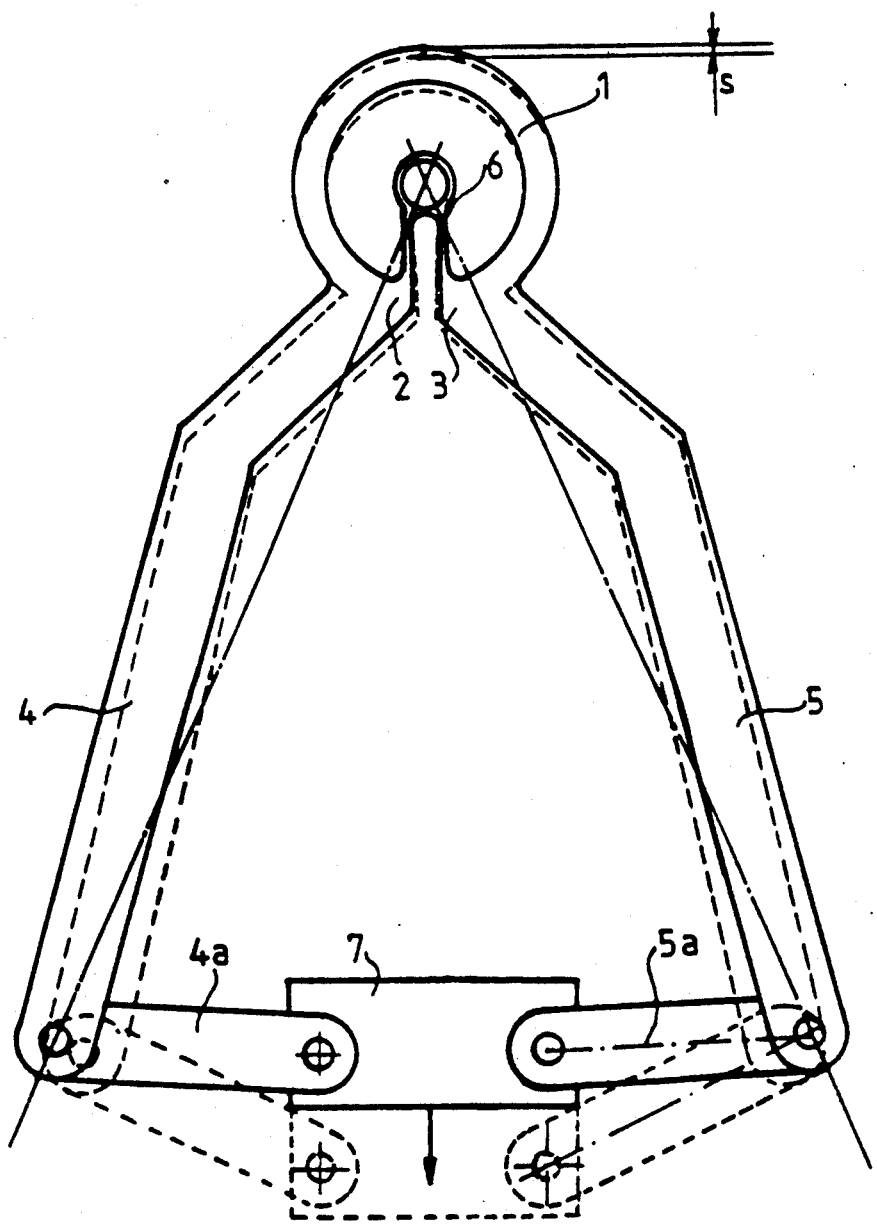
FIG. 1 shows a mechanism for accurate adjustment of the displacements of a payload as used in the prior art and described above.

It should naturally be understood that the drawings and the corresponding portions of the description are given purely to illustrate the subject matter of the invention and that they do not constitute any kind of limitation.

The adjustment mechanism shown in FIG. 2 is given overall numerical reference 100 and comprises a resiliently deformable ring 10 (e.g. made of special spring steel or of stainless steel) having rod elements 10a, with a double-acting actuator 11 disposed therein, with action being exerted in opposite directions by components 12 and 13 whose axes are in alignment: naturally, the actuator is shown highly diagrammatically essentially to illustrate the operating principle. The type of actuator used in practice depends on the intended application: to this end, it is possible to use stepper motors or electromechanical type control members for coarser applications or piezoelectric devices for finer applications.

A plate 15 which supports a payload P is fixed at one of its ends 16 to the resilient ring 10, while its opposite end 17 is pivotally connected to a fixed structure 19 via a flexible pivot 18 (e.g. formed by a membrane, or by a narrow plate having very low bending thickness associated with very high axial thickness).

The dot-dashed line shows the position of the plate 15 when the ring 10 is deformed. It is easily shown that the mechanism 100 shown in FIG. 2 is capable of transforming linear deformations $\delta$ of the resiliently deformable ring 10 into rotations of the plate 15 through an angle $\beta$.

The relative disposition of the actuator and of the means 20 for fixing the plate 15 to the ring 10 (applying criteria described below) and in particular implemented in the form of a spring clip as shown diagrammatically in FIGS. 2 and 3, serves to obtain fine adjustment or coarse adjustment depending on requirements. This may be done by rotating the ring and its actuator so as to change the line of action of the actuator relative to the position of the plate, as shown in FIG. 3, e.g. by means of a stepper motor 14 (cf. FIG. 2) which rotates the actuator and the ring together. Naturally, provision must be made to ensure that the connection means allow the ring to slide freely relative to the plate, and this can be achieved technically in various different ways.

The device 200 shown in FIG. 4 uses two rings 10 of the type described above for use in the mechanism 100 of FIG. 2: that is why the same reference numerals are used for parts relating to the two rings in FIG. 4.

It may be observed that the actuators of the two rings 10 are interconnected by a rigid rod 21 which is in turn connected to the fixed structure 19 represented diagrammatically, as in FIG. 2, by the symbol for ground. The box 22 represents an electronic control device for the actuators 11.

The plate 15a for supporting the payload (not shown in FIG. 4 in order to simplify the drawing) is shown diagrammatically in FIG. 5 to show the connection means 20a that are used for fixing to opposite ends of the plate 15a the the two rings 10. It can easily be shown that with the device 200, the deformations δ' and δ" of the two rings 10 (cf. FIG. 7) give rise to a combined rotation and translation movement of the support plate 15a, which reduces to pure rotation thereof through an angle β (cf. FIG. 8) if the two rings 10 are subjected to equal deformations in opposite directions.

Naturally, the mechanism 200 is also capable of providing adjustments that are fine or coarse depending on the positions of the means 20a for fixing the load support plate to the two rings (with reference 23 designation fixing screws).

There follows a description of the way in which the adjustment mechanism of the invention acts, thus making it easier to understand its originality.

$\theta$ designates the angle relative to the axis x—x of the actuator 11 defining the position of an arbitrary point P on the elastically deformable ring 10 when in the non-deformed state, and the position of the corresponding point P* on the ring when in the deformed state. The point P* is thus disposed on the same line as the line connecting the center O of the ring to the point P. The deformation δ which is a function of the angle $\theta$ is thus geometrically defined by: OP*-OP (cf. FIG. 6) and is either positive or negative in sign. The maximum (positive) value $\delta_{max}$ of the deformation is applied to diametrically opposite points $P_M$, which lie on the axis x—x of the actuator and which move to take up positions $P^*_M$, whereas the minimum (negative) value $\delta_{min}$ applies to points $P_m$ which are likewise diametrically opposite but which are situated on the axis y—y that is perpendicular to the axis x—x of the actuator, with these points moving to take up positions $P^*_m$, such that (cf. FIG. 6):

$$\delta_{max} = OP^*_M - OP_M$$

$$\delta_{min} = OP^*_m - OP_m$$

Figure 6:
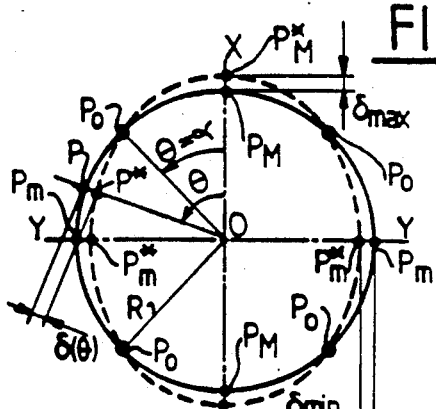
FIG. 6 is a diagram with dashed lines showing the deformed state configuration of the ring of the mechanism shown in FIG. 2 or of the rings of the mechanism shown in FIG. 4, with the non-deformed shape of the ring(s) being shown by a solid line.

It can easily be shown that there exist points given the reference $P_O$ in FIG. 6 that are subjected to no displacement (at least to a first approximation): for these points $P^*_O = P_O$ (there is no change in radius).

The following analytic development shows that the deformations of the resilient ring at points close to the points $P_O$ are very small, with the angular positions of these points being defined by a characteristic angle $\theta = \alpha$.

It is this condition that is made use of in the context of the present invention to preform fine adjustments of the orientation and/or position of a payload, by fixing the connection means 20 or 20a of the payload support plate 15 or 15a to points that are very close to the point $P_O$.

In contrast, fixing the connection means at points that are relatively far from the point $P_O$ makes it possible to perform coarse adjustments.

These conditions which are satisfied by the mechanism of the invention can be demonstrated on the basis of an analytic expression for the deformation δ of the diameter of the resilient ring as a function of the angle $\theta$, and as a function of the properties of the ring and of the deformation force applied thereto.

This function $\delta(\theta)$ can be obtained by using conventional elasticity theory (cf. in particular the work by S. Timoshenko entitled "Strength of materials" published by Van Nostrand Co., New York).

For reasons of simplicity, it is assumed below that shear forces are negligible. This assumption is justified by the type of section used for the ring, said section being rectangular and satisfying the following two conditions simultaneously:

$$t < a/5$$

$$t < R/30$$

where t is the radial thickness of the ring, a is its axial width, and R is its radius.

Figure 9:
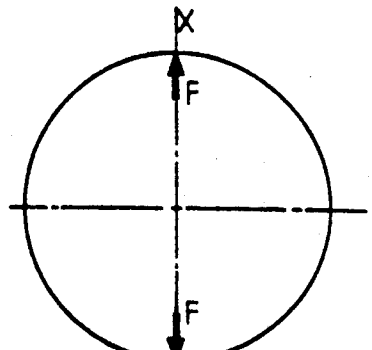
FIGS. 9 to 11 are static equivalent diagrams of the ring(s) of the mechanism of the invention for use in applying the principle of virtual work.
Figure 10:
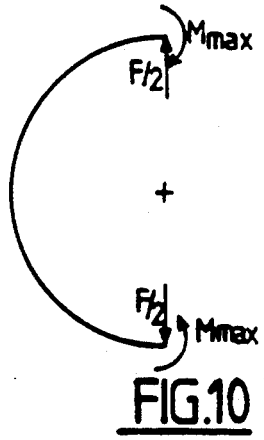

If the deformation force applied by the above-specified actuator is written F, the ring may be represented diagrammatically as in FIG. 9. FIG. 10 is the static equivalent of FIG. 9 and shows the maximum bending moment $M_{max}$ as given by the following expression (cf. Timoshenko):

$$M_{max} = -FR/\pi$$

and the distribution of the bending moment M as a function of the angle $\theta$ is given by:

$$M(\theta) = FR (\sin \theta/2 - 1/\pi)$$

Figure 11:
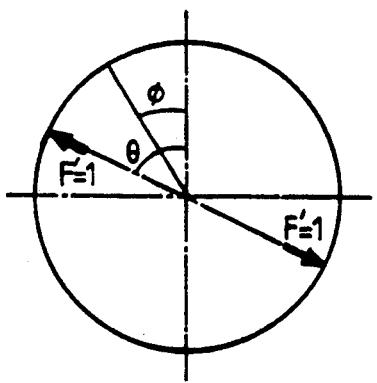

The deformation $\delta(\theta)$ on a generic diameter specified by the angle $\theta$ can be determined by applying the principle of virtual work to the ring subjected to a unit deformation force F' as shown in FIG. 11.

For this fictitious structure, the bending moment distribution M' is given by:

$$M' = 0 \text{ for } \phi < \theta$$

$$M' = 1.R. \sin (\phi - \theta) \text{ for } \theta < \phi < \theta + \pi$$

$$M' = 0 \text{ for } \phi > \theta + \pi$$

By applying the principle of virtual work, it is possible to write:

$$2.\delta = M'(FR^2/EJ)(\sin \theta/2 - 1/\pi)d\phi$$

This equation can be simplified by applying conventional trigonometrical rules to the following expression:

$$\delta = (FR^3/2EJ)(\pi \cos \theta/4 - 2/\pi)$$

which becomes:

$$\delta = kf(\theta)F$$

in which:

$$k = R^3/2EJ$$

$$f(\theta) = \pi \cos \theta/R - 2/\pi = 0.25\pi \cos \theta - 2/\pi$$

From the expression for δ obtained in this way, it is possible to calculate the maximum (positive) deformation $\delta_{max}$ and the minimum (negative) deformation $\delta_{min}$ of the ring, given that $\delta_{max}$ corresponds to the angle $\theta = 0$, i.e. the diametrically opposite points at which the deformation force is applied, while $\delta_{min}$ corresponds to the angle $\theta = \pi/2$. Under these circumstances, it is thus possible to write:

$$\delta_{max} = Kf(0)F = KF(\pi/4 - 2/\pi)$$
$$= KF(\pi^2 - 8)/4\pi$$

whereas:

$$\delta_{min} = Kf(\pi/2)F = -2KF/\pi$$

It is also possible to calculate the ratio between the maximum and minimum deformations, as defined by the following expression:

$$|\delta_{max}/\delta_{min}| = (\pi^2 - 8)/8 = \pi^2/8 - 1 \approx 0.234$$

In the above expressions, the symbols E and J are used conventionally to represent Young's modulus for the material from which the resilient ring is made and the moment of inertia of the section of the ring, respectively. For a rectangular section having dimensions $t \times a$, as assumed above, J is given by the following expression:

$$J = at^3/12$$

By selecting the following values:

$a = 5$ mm $t = 1$ mm $R = 30$ mm $E = 210 \text{N/mm}^2$ the constant K has the value given below:

$K \approx 0.154$ mm/N

It is also possible to calculate the value of $\theta = \alpha$ at which deformation is null, i.e. for which:

$$f(\alpha) = 0.25 \pi \cos \alpha - 2/\pi = 0$$

which gives the following value for $\alpha$:

$\alpha = \arccos(8/\pi^2) \approx 35.8$ degrees

Under these circumstances, it is easy to show that the mechanism of the invention enables the orientation of a payload to be adjusted finely. If the connection means for the payload support plate are placed at points defined by an angle $\theta$ that is close to $\alpha$, e.g.:

$\theta = 35$ degrees then $$f(35) \approx 0.006740 = 6.740 \times 10^{-3}$$

thus giving deformation:

$$\delta(35) = Kf(35)F \approx 1.038 \times 10^{-3}F$$

which corresponds to a deflection of about 1 mm when a deformation force $F = 1N$ is applied.

In turn, this deflection corresponds to the support plate rotating through an angle $\beta$ (assuming that the support plate is of length $L = 200$ mm), given as follows:

$$\beta = \arctan 2\delta/L \approx 5.94 \times 10^{-4} \text{ degrees} \approx 2.14''$$

which is a very small rotation.

Figure 8:
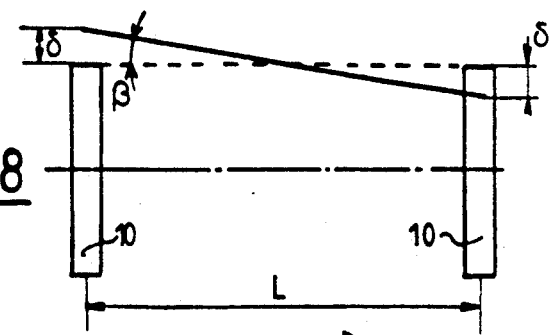

This calculation of $\beta$ applies to the mechanism of FIG. 4 which is reproduced for this purpose in FIG. 8 for reasons of clarity, i.e. for the case where the plate is subjected to rotation only without any translation, which corresponds to the two rings being subjected to deformations that are equal but in opposite directions.

Figure 7:
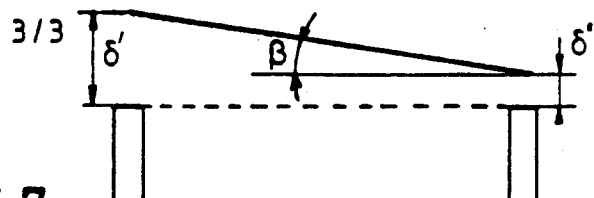
FIGS. 7 and 8 are diagrams showing two ways in which the mechanism shown in FIGS. 4 and 5 can act.

Naturally, in the general case where the movement imparted to the plate is a combination of rotation and of translation, because the two rings are subjected to different deformations $\delta'$ and $\delta''$, the rotation of the plate is given by the following expression:

$$\beta = \arctan(\delta' - \delta'')/L$$

as shown in FIG. 7.

The performance of the adjustment mechanism of the invention can be appreciated by comparing it with the Matra APM-PA antenna pointing mechanism which, as mentioned above, can achieve an accuracy of only $2 \times 10^{-3}$ degrees, even though it constitutes the best device of this type known in the state of the art, i.e. it is capable of achieving a rotation that is about one order of magnitude less accurate than in the preceding example where $\beta \approx 5.14 \times 10^{-4}$ degrees.

However, the above value should not be considered as being the upper limit on the accuracy of the adjustment mechanism of the invention. Much smaller angles of rotation can be obtained by selecting different operating conditions, i.e. appropriate values for the various construction parameters.

For example, assuming other conditions remain identical to the example given above, the angle of rotation $\beta$ corresponding to fixing the support plate at a point defined by the angle $\theta = 35.5$ degrees (nearer still to the value $\alpha = 35.8$ degrees) can be calculated.

Under such circumstances:

$$f(35.5) \approx 0.002785 = 2.785 \times 10^{-3}$$

thus giving a deformation:

$$\delta(35.5) = Kf(35.5)F \approx 4.289 \times 10^{-4}F$$

which for $F = 0.1N$ is equal to:

$\delta \approx 4.29 \times 10^{-5}$ mm

This deformation corresponds to the plate rotating through the following angle:

$\beta \approx 2.45 \times 10^{-5}$ degrees i.e. a value which is about two orders of magnitude smaller than that given by the performance of the best previously-developed antenna pointing mechanism.

Naturally, a practical implementation of an adjustment mechanism having such high performance depends above all on the design of the connection means between the support plate and the elastically deformable ring, and also on the type of actuator used.

In addition, the influence of thermal distortions due to a non-uniform distribution of temperature in the ring needs to be minimized by adopting appropriate means to constitute a heat shield and/or to provide thermal insulation.

Because of the remarkable simplicity of the mechanism of the invention, it lends itself to numerous terrestrial and space applications.

In any event, because of the extremely small rotations that can be obtained, the most advantageous applications concern optical devices for adjusting the orientation and/or the position of mirrors and lenses.

Naturally, the mechanism of the invention can also be used for pointing an antenna.

Various examples of space applications are given below:

a fine pointing mechanism for deflecting light beams and thus realizing optical intersatellite links, in particular through laser beams.

This can be advantageous for pointing payloads (in particular constituted by scientific apparatus) on board satellites, in particular SAT-2 or DRS satellites in the Silex program: in addition to the wide angle coarse adjustment mechanism that drives the telescope thereon, there is also a need for a fine pointing mechanism to track a target on a screen. Under such circumstances very high accuracy is needed, to locate the target, of the order of $5 \times 10^{-3}$ degrees, and this is easily achieved by the mechanism of the invention;

use as an ahead fine pointing mechanism which requires extremely high accuracy, of the order of $10^{-3}$ degrees, over a very small angular range of 0.33 degrees, also forming a part of the above-mentioned Silex program.

As can be seen from the above, the invention is not limited in any way to those implementations and applications that are described in greater detail. On the contrary, the invention extends to any variant that may occur to the person skilled in the art without going beyond the context or the scope of the present invention.

I claims:

1. A mechanism for finely adjusting the orientation and/or the position of a payload, the mechanism comprising:

payload support means (15; 15a);

elastically deformable resilient means (10) that are circularly symmetrical in the non-deformed state;

deformation means (11) for deforming the resilient means (10); and connection means (20; 20a) for connecting the payload support means (15; 15a) to the resilient means (10) enabling deformations thereof to be communicated to the payload support means and thus to the payload;

which mechanism is characterized in that:

the resilient means are constituted by at least one continuous ring (10) having predetermined radius (R), radial thickness (t), and axial width (a);

the payload support means (15; 15a) is disposed relative to the ring (10) in such a manner as to transform deformation thereof into rotation or into combined rotation and translation of the support means;

the deformation means (11) for deforming the ring (10) which cause the ring to go from the non-deformed state to the deformed state are suitable for applying an outwardly directed deformation force (F) to said ring simultaneously at two diametrically opposite points ($P_M$) of the ring (10) defining a diametral action line (x—x) of the deformation means (11), said ring (10) having singular points ($P_O$) which remain substantially stationary when the ring goes from the non-deformed state to the deformed state with the distributions of the singular points on the ring (10) being a function of the orientation of the diametral line of action (x—x) of the deformation means (11) relative to a reference diameter of the ring passing through the location of said connection means thereon; and it further includes means (14) for varying the orientation of the diametral action line (x—x) of the ring deformation means (11) within predetermined limits, thereby varying the distribution of said substantially fixed points ($P_O$) of the ring in such a manner that the location of the connection means coincides with varying positions including positions close to and positions distant from said substantially fixed points ($P_O$) of the ring (10), the deformations of the ring corresponding to said positions enabling fine and coarse adjustments respectively of the payload support means (15; 15a) and thus of the payload.

2. A mechanism according to claim 1, characterized in that the deformation means are constituted by a double-acting actuator (11) disposed inside the resilient ring (10) so as to bear against two diametrically opposite points ($P_M$) of the inside surface of the ring.

3. A mechanism according to claim 1 or 2, characterized in that the resiliently deformable means are constituted by two rings (10) each of which has an actuator (11) of the above type disposed therein, these two actuators being connected to a fixed structure (19) via a rigid link (21) which interconnects the two actuators (11), the payload support means being constituted by a plate (15a) fixed at two opposite ends to the two rings (10).

4. A mechanism according to claim 1 or 2, characterized in that the resiliently deformable means are constituted by a single ring (10) having the above-mentioned actuator (11) disposed therein, the support means being constituted by a plate (15) having one end fixed to the ring (10), and having its opposite end pivotally mounted to a fixed structure (19) about a flexible pivot (18).

5. A mechanism according to claim 4, characterized in that the means for varying the orientation of the diametral line of action (x—x) of the ring deformation rings (11) comprise a stepper motor (14) which drives the actuator (11) and the ring (10) together, the connection means (20) being suitable for enabling the ring (10) to slide freely relative to the support plate (15).

* * * * *